(12) United States Patent
Kumeuchi et al.

(10) Patent No.: US 8,617,731 B2
(45) Date of Patent: Dec. 31, 2013

(54) FILM-COVERED BATTERY AND ASSEMBLED BATTERY

(75) Inventors: Tomokazu Kumeuchi, Sendai (JP); Takao Daidoji, Sendai (JP); Isao Tochihara, Sendai (JP)

(73) Assignee: NEC Energy Devices, Ltd., Sagamihara-shi, Kanagawa (JP)

( * ) Notice: Subject to any disclaimer, the term of this patent is extended or adjusted under 35 U.S.C. 154(b) by 1151 days.

(21) Appl. No.: 11/674,807

(22) Filed: Feb. 14, 2007

(65) Prior Publication Data
US 2007/0190402 A1 Aug. 16, 2007

(30) Foreign Application Priority Data
Feb. 15, 2006 (JP) ................................ 2006-037903

(51) Int. Cl.
*H01M 2/12* (2006.01)
*H01M 2/02* (2006.01)
*H01M 2/08* (2006.01)
*H01M 4/13* (2010.01)
*H01M 4/58* (2010.01)

(52) U.S. Cl.
USPC ............. 429/53; 429/82; 429/185; 429/181; 429/223; 429/224; 429/231.1; 429/231.3; 429/231.6

(58) Field of Classification Search
USPC ............ 429/53, 82, 181, 185, 224, 231, 223, 429/231.1–231.6
See application file for complete search history.

(56) References Cited

U.S. PATENT DOCUMENTS

| | | | |
|---|---|---|---|
| 2001/0051298 A1* | 12/2001 | Hanafusa et al. | 429/162 |
| 2005/0123828 A1* | 6/2005 | Oogami et al. | 429/152 |
| 2006/0194103 A1* | 8/2006 | Otohata et al. | 429/185 |

FOREIGN PATENT DOCUMENTS

| | | | |
|---|---|---|---|
| JP | 11-86823 A | | 3/1999 |
| JP | 11-97070 A | | 4/1999 |
| JP | 11097070 A | * | 4/1999 |
| JP | 11-312505 A | | 11/1999 |
| JP | 2000-100399 A | | 4/2000 |
| JP | 2000-228224 A | | 8/2000 |
| JP | 2000-277065 A | | 10/2000 |
| JP | 2001-357848 A | | 12/2001 |
| JP | 2004-103258 A | | 4/2004 |
| JP | 2005-116474 A | | 4/2005 |
| JP | 2003-132868 A | | 5/2013 |

OTHER PUBLICATIONS

Notice of Rejection dated Jan. 13, 2012, issued in corresponding Japanese Patent Application No. 2006-037903 (4 pages).
Notice of Rejection dated Oct. 4, 2013, issued in Japanese Patent Application No. 2012-054745, w/ English translation (6 pages).

* cited by examiner

*Primary Examiner* — Karie O'Neill Apicella
(74) *Attorney, Agent, or Firm* — Westerman, Hattori, Daniels & Adrian, LLP

(57) ABSTRACT

The invention provides a closed type battery comprising a battery element covered with a covering film and a heat fusion seal portion formed by heat fusion on a periphery of the covering film, wherein the cleaving strength upon an internal pressure rise of a seal portion positioned between a positive electrode terminal and a negative electrode terminal is larger than that of any other seal portion, and a safety valve adapted to release pressure upon a battery's internal pressure rise is located at a portion other than said inter-terminal seal portion. The invention also provides an assembled battery wherein a plurality of closed type batteries are stacked one upon another while a safety valve adapted to release pressure upon an increase in the internal pressure of the battery is located at a position in no contact with the covering film surface of an adjoining battery.

7 Claims, 11 Drawing Sheets

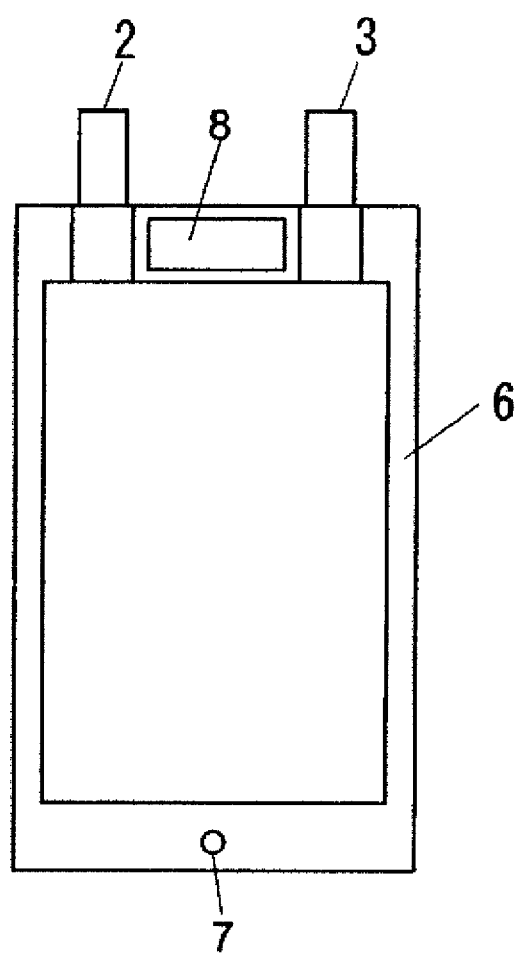
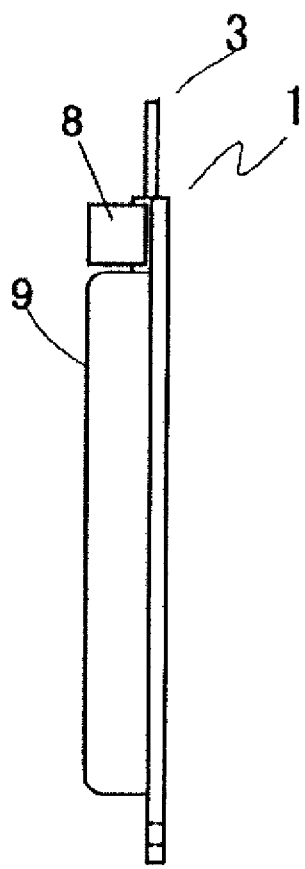
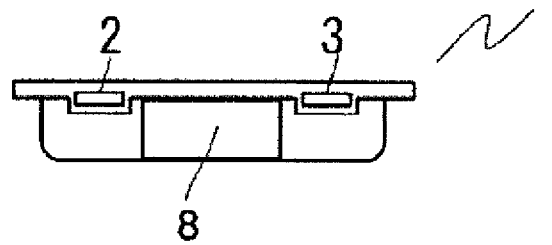

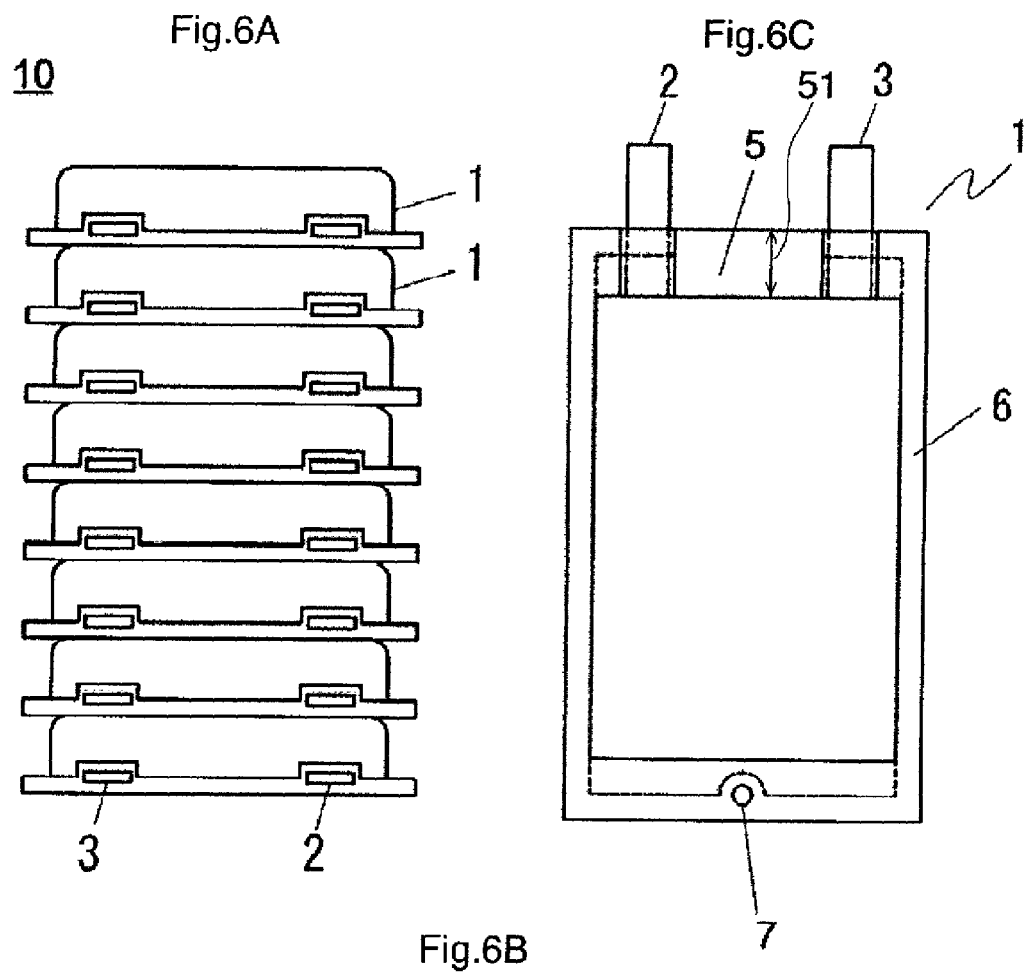
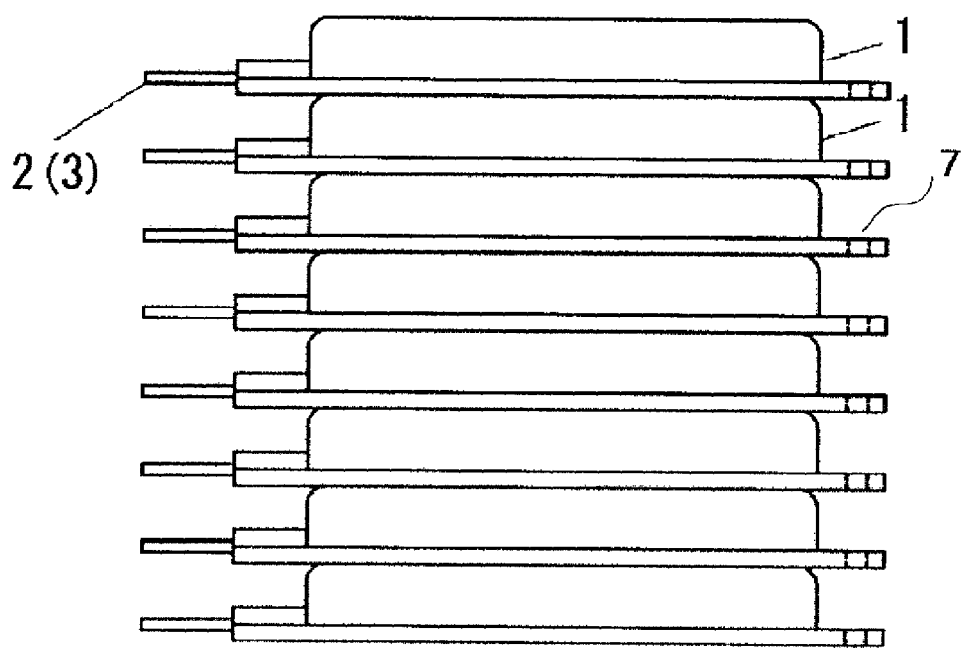

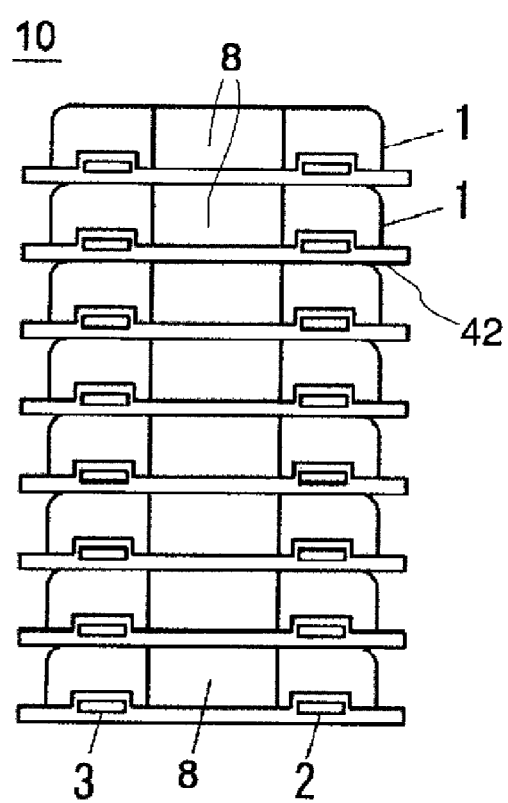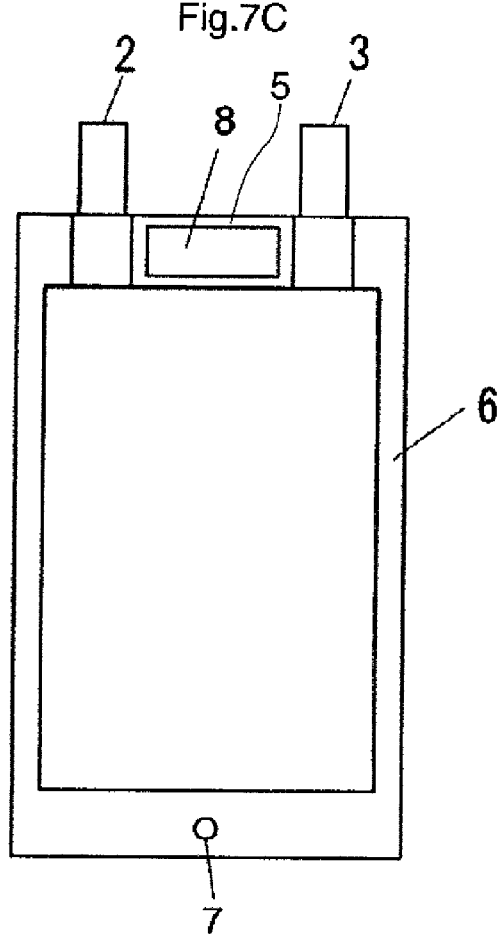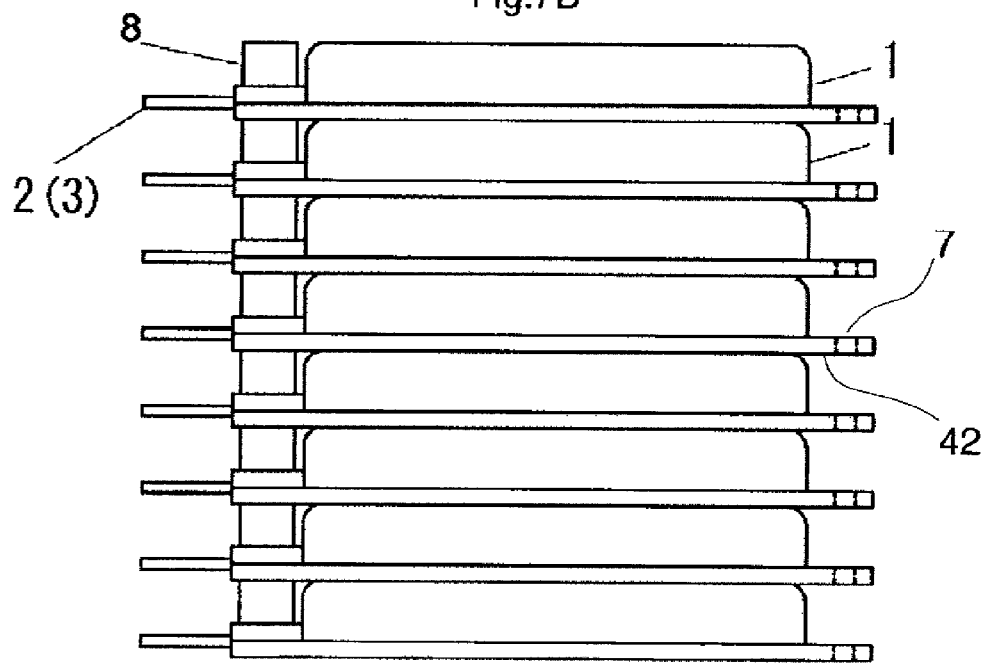

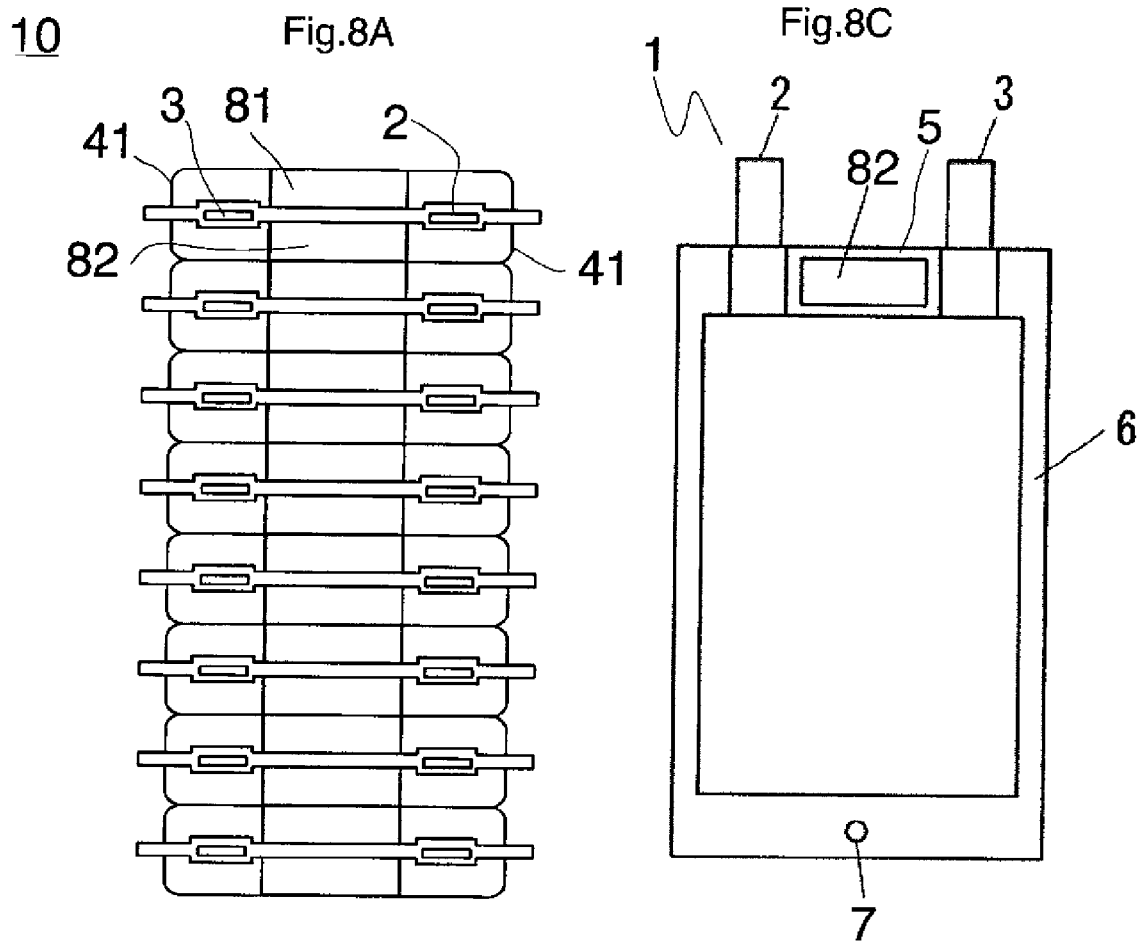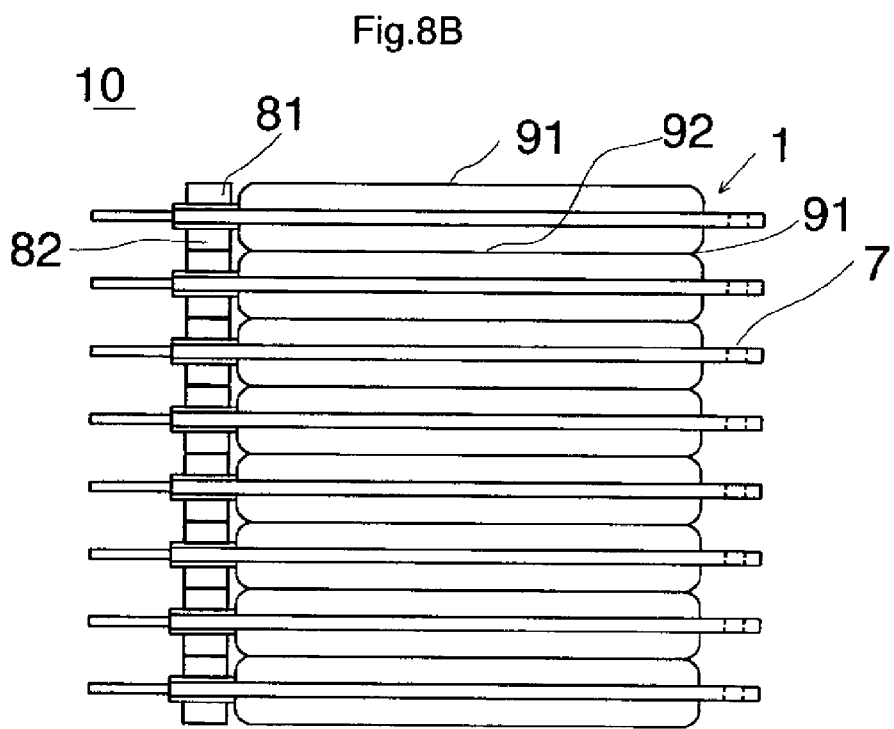

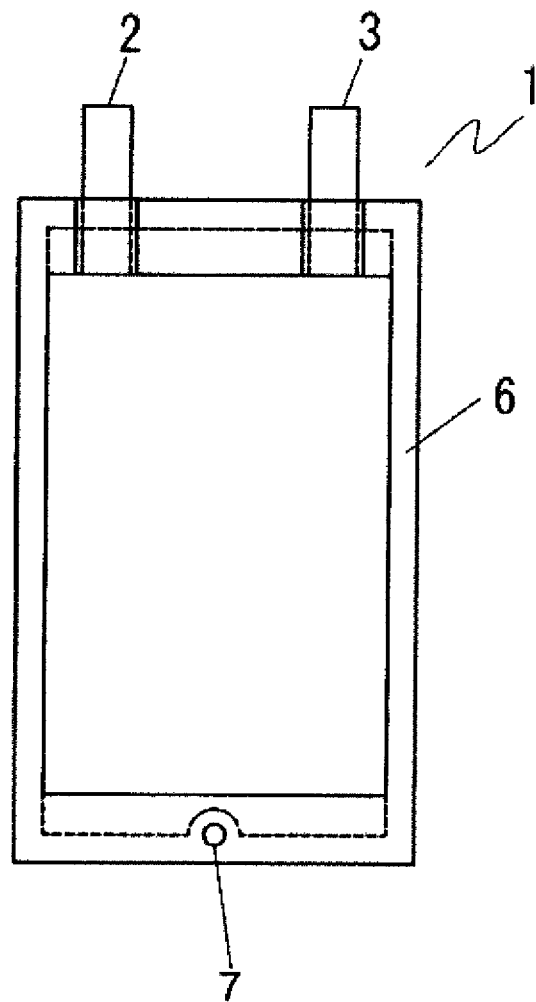
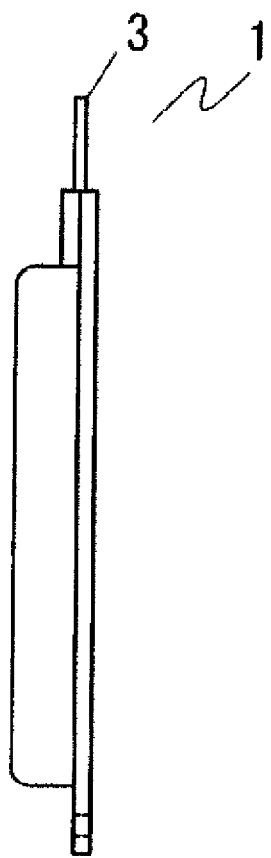
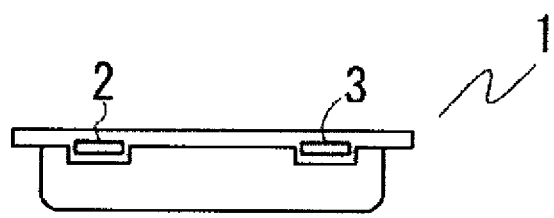

FILM-COVERED BATTERY AND
ASSEMBLED BATTERY

CROSS-REFERENCE TO RELATED
APPLICATIONS

This application is based upon and claims the benefit of priority from prior Japanese Patent application N. 2006-37903, filed on Feb. 15, 2006, the entire contents of which are incorporated herein by reference.

BACKGROUND

1. Technical Field

The present invention relates to a closed type battery such as a lithium ion battery provided with a covering film having a safety valve and an assembled battery with such lithium ion batteries connected in series and/or parallel, and to a structure adapted to ensure that the safety valve is put in operation upon generation of gases by abnormal charging or the like.

2. Related Art

Lithium ion batteries, because of being more lightweight and higher in energy density than other secondary batteries such as nickel-cadmium or nickel-hydrogen ones, are now increasingly used just only as drive power sources for portable terminals such as cellular phones, notebook PCs and video cameras, but also as power sources for electric cars or vehicles.

A lithium ion battery is built up of a negative electrode formed of carbon or other material capable of doping and dedoping lithium ions, a positive electrode formed of a lithium-containing transition metal oxide such as lithium cobaltate, lithium nickelate and lithium manganate, and an electrolysis solution composed of an organic solvent with a lithium salt such as $LiPF_6$ dissolved in it. When that organic electrolysis solution is placed in a voltage area much greater than 4.2 V, it often gives out combustible gases, etc. by way of oxidative breakdown, causing the battery to generate heat or break due to an increase in the battery's internal pressure.

Applications with a multiplicity of lithium ion batteries connected in series and parallel, for instance, power sources for electric bicycles, electric cars, etc. and uninterruptible power sources have grown large. When a covering film with a synthetic resin film and an aluminum foil or the like laminated together is used as a covering member for a plurality of batteries, it is possible to obtain an assembled battery greater in capacity density and weight density than that obtained using a metal can as the covering member.

With the generation of gases, however, a lithium ion battery fabricated using a flexible covering film swells or inflates a lot more than does one fabricated using a metal can as the covering member. For the lithium ion battery using a covering film as the covering member, there have thus been numerous proposals made of a safety valve adapted to expel the generated gases from within it.

For a battery with a covering film used as the covering member, two covering films, each having a three-layer structure of nylon film/aluminum foil/polypropylene film, are used. The battery is sealed up around by the heat fusion of the polypropylene layers. When the battery is in an abnormal state for the reasons of overcharging or the like, gases are generated by the decomposition of an electrolysis solution or otherwise battery elements generate heat. In turn, it will cause the heat fusion seal to break open or even burst up.

In this conjunction, JP-A-1999-086823 and 1999-097070 have come up with providing a part of the seal with a site having pressure resistant performance lower than the rest or providing the heat fusion seal with a site having a lower peel strength, so that such sites can cleave selectively.

JP-A-1999-312505 has proposed a low-profile battery having a safety valve wherein the innermost resin layer of a covering film is made partially thin enough to cleave upon an increase in the internal pressure, and JP-A-2000-100399 has come up with making the heat fusion temperature for a seal area functioning as a safety valve lower than that for a seal area having no safety valve.

Further, JP-A-2005-116474 has proposed a battery wherein a laminated film is used as a covering film, and a safety valve having a valve body comprising a low-melting resin is located at a part of a heat fusion seal with a heat conduction member capable of conducting heat generated from battery elements directly to the safety valve.

A lithium ion battery with a flexible covering film applied on it is shown in FIG. 11. A stack member that becomes a battery element with a positive 2 and a negative electrode terminal 3 drawn out of it is covered at its top side with an embossed covering film and at its bottom side with a flat covering film. A periphery 6 is heat fused in order for each side by a hot plate or a frame-form hot plate.

A safety valve 7 is provided at the fusion side from which the positive 2 and the negative electrode terminal 3 are not drawn. When a plurality of such batteries as fabricated as mentioned above are connected together and used, such a safety valve fails to perform its own function, because portions of the seal other than the safety valve break open under the influences of heat and gases generated from nearby batteries.

Referring especially to a lithium ion battery using a covering film with the positive 2 and the negative electrode terminal 3 for drawing currents mounted at the same seal side, a sealant material is located at the positive electrode terminal 2 made of aluminum and the negative electrode terminal 3 made of nickel or copper to prevent leakages and increase fusion strength. However, when there is heat generated from the battery, the heat fusion seal of the periphery 6 may often break open between both the terminals, because the seal portion contacting the metal positive or negative electrode terminal becomes higher in temperature than other seal portions.

SUMMARY

The present invention provides a closed type battery comprising a battery element covered with a covering film and a heat fusion seal portion formed by heat fusion on a periphery of the covering film, wherein a cleaving strength upon an internal pressure rise of a seal portion positioned between a positive electrode terminal and a negative electrode terminal is larger than that of any other seal portion, and a safety valve adapted to release pressure upon a battery's internal pressure rise is located at a portion other than said inter-terminal seal portion.

In the aforesaid closed type battery, a heat fusion seal portion extending from an outer periphery of the battery around said inter-terminal seal portion to within the battery is wider than that positioned at any other seal portion.

In the aforesaid closed type battery, said inter-terminal seal portion is provided on its outer surface with a retaining member adapted to press the seal portion when the battery is incorporated in battery drive equipment.

In the aforesaid closed type battery that is a lithium ion battery, a composite lithium manganese oxide having a composition formula $Li_{1+x}Mn_{2-x-y}M_yO_{4-z}$ where $0.03 \leq x \leq 0.16$, $0 \leq y \leq 0.1$, $-0.1 \leq z \leq 0.1$, and M is at least one selected from Mg, Al, Ti, Co and Ni is used for a positive electrode active substance.

Also, the present invention provides an assembled battery, wherein unit batteries, each comprising a battery element covered with a covering film and a heat fusion seal portion formed by heat fusion on a periphery of the covering film, wherein a cleaving strength upon an internal pressure rise of a seal portion positioned between a positive electrode terminal and a negative electrode terminal is larger than that of any other seal portion, are connected at least in series or parallel, while a safety valve adapted to release pressure upon a battery's internal pressure rise is located at a portion other than said inter-terminal seal portion and in no contact with a covering film surface of an adjoining battery.

In the aforesaid assembled battery, a heat fusion seal portion extending from an outer periphery of the battery around said inter-terminal seal portion to within the battery is wider than that positioned at any other seal portion.

In the aforesaid assembled battery, closed type batteries, each having a heat-resistant retaining member adapted to press an outer surface of the inter-terminal seal portion, are stacked one upon another.

In the aforesaid assembled battery that comprises a lithium ion battery, a composite lithium manganese oxide having a composition formula $Li_{1+x}Mn_{2-x-y}M_yO_{4-z}$ where $0.03 \leq x \leq 0.16$, $0 \leq y \leq 0.1$, $-0.1 \leq z \leq 0.1$, and M is at least one selected from Mg, Al, Ti, Co and Ni is used for a positive electrode active substance.

BRIEF DESCRIPTION OF THE DRAWINGS

The invention will be described with reference to the accompanying drawings, wherein like numbers reference like elements.

FIG. 2A is a front view illustrative of a closed type battery according to another embodiment of the invention; FIG. 2B is a plan view of the same; and FIG. 2C is a side view of the same.

FIG. 6A is a view of an assembled battery according to one embodiment of the invention as viewed from a terminal side; FIG. 6B is a side view of the same; and FIG. 6C is a front view of a unit battery forming a part of the assembled battery.

FIG. 7A is a view of an assembled battery according to another embodiment of the invention as viewed from a terminal side; FIG. 7B is a side view of the same; and FIG. 7C is a front view of a unit battery forming a part of the assembled battery.

FIG. 8A is a view of an assembled battery according to yet another embodiment of the invention as viewed from a terminal side; FIG. 8B is a side view of the same; and FIG. 8C is a front view of a unit battery forming a part of the assembled battery.

FIG. 11A is a front view illustrative of a closed type battery using a conventional covering film; FIG. 11B is a plan view of the same; and FIG. 11C is a side view of the same, all as viewed from a terminal side.

DESCRIPTION OF EXEMPLARY EMBODIMENTS

The present invention provides a closed type battery covered with a covering film with a positive and a negative electrode terminal located on the same side, which ensures that upon an increase in the internal pressure of the battery, the internal pressure is released off by way of a safety valve while any other fusion seal portion are left uncleft.

More specifically, according to the closed type battery of the invention, the strength of a cleavage due to an increase in its internal pressure of a heat fusion seal portion that forms a seal portion positioned between a positive and a negative electrode terminal is increased, and a safety valve is provided at a seal portion other than that between the positive and the negative electrode terminal which also provides a site ensuring a smooth operation even when a plurality of batteries are stacked together, thereby ensuring to expel internal gases from them by way of the safety valve.

The present invention also provides an assembled battery comprising a plurality of lithium ion batteries or other closed type batteries connected together. When that assembled battery is left overcharged for some unknown reasons to cause gases to be generated in it, resulting in an increase in its internal pressure or causing battery elements to generate heat, it is possible to release pressure by way of the safety valve, thereby preventing the battery from bursting up or finding where gases are being released, so that the generated gases can be collected. It is thus possible to obtain an assembled battery with improved safety comprising lithium ion batteries or the like.

The present invention is now explained with reference to a lithium ion battery as an example.

Figure 1A:
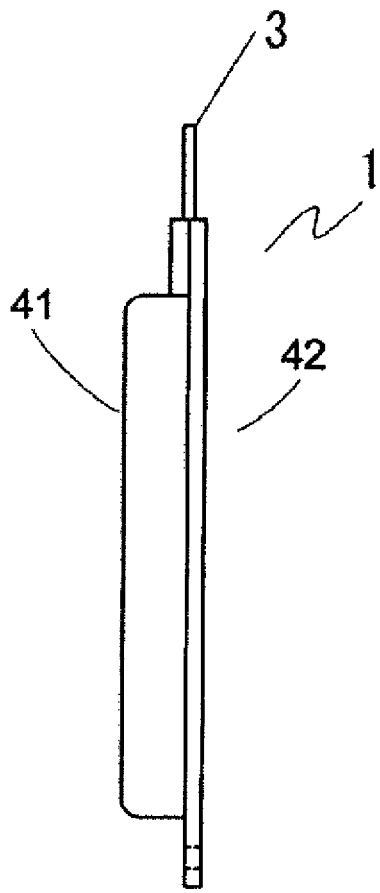
FIG. 1A is a front view illustrative of a closed type battery according to one embodiment of the invention.
Figure 1C:
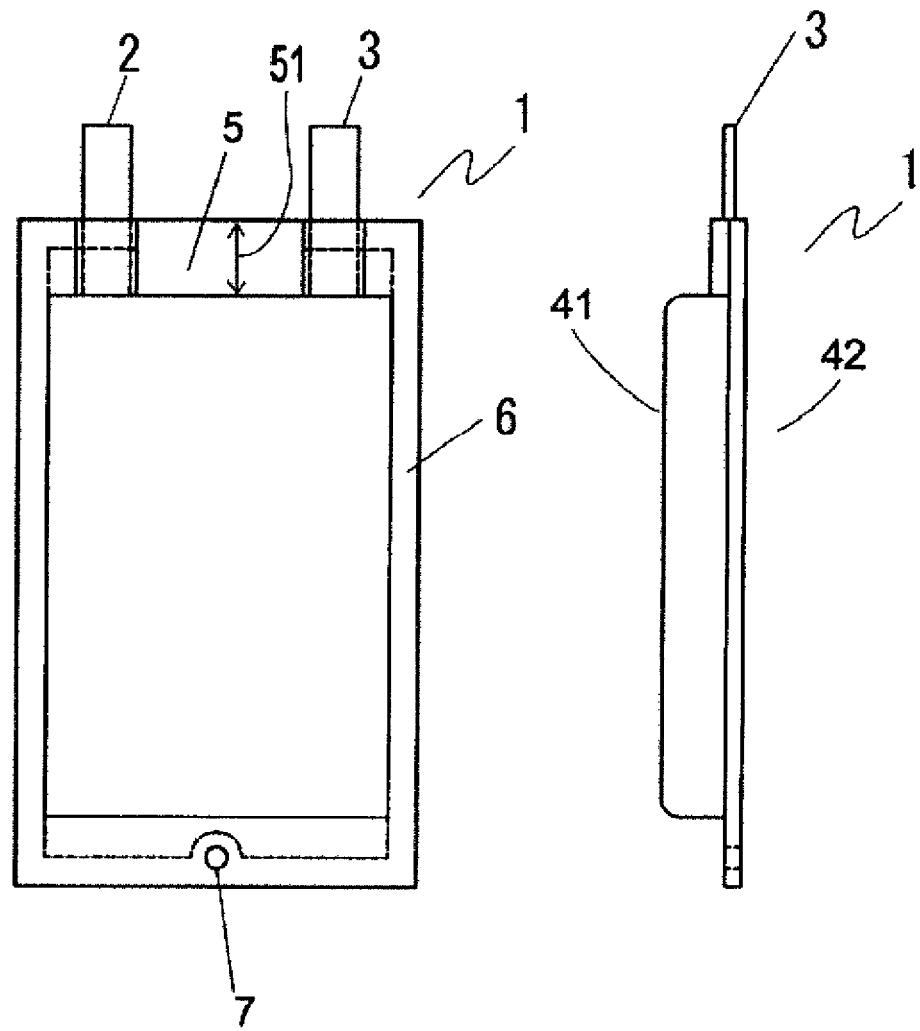
FIG. 1C is a side view of the same.
Figure 1B:
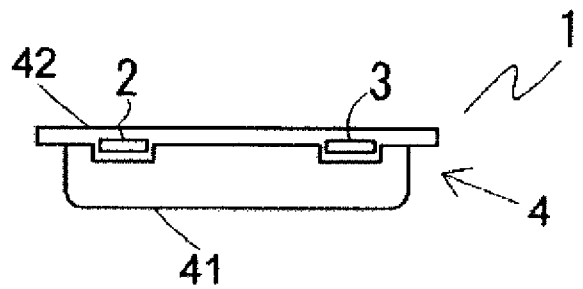
FIG. 1B is a plan view of the same.

FIGS. 1A, 1B and 1C are illustrative of the lithium ion battery according to one embodiment of the invention.

A lithium ion battery 1 is built up of a battery element wherein a positive and a negative electrode, each in a flat-sheet form, are stacked together with a separator between them, or an electrode element wherein a positive and a negative electrode, each in a belt form, are wound together in the order of positive electrode/separator/negative electrode/separator and thereafter pressed flat. Then, each electrode element is joined with a positive 2 and a negative electrode terminal 3, and covered and sealed around with a covering film 4 used as a covering member by means of heat fusion.

Around a portion of the periphery of the battery other than a seal portion 5 between the positive and negative terminals 2 and 3, there is provided a safety valve 7 provided, which is adapted to cleave upon an increase in the internal pressure of the battery, thereby permitting the pressure to release off.

The safety valve 7 may be formed by heat fusion to a hole in the covering film 4 of a film that cleaves at a pressure lower than the cleaving pressure of the covering film 4, or by forming a notch, a thinned portion or the like in the covering film 4.

In the lithium ion battery 1 of the invention, on the other hand, the seal portion 5 between the positive 2 and the negative electrode terminal 3 has a heat fusion width 51 that is wider than any other seal portion so as to prevent the sealed portion 5 from cleaving upon an increase in the internal pressure.

As a consequence, the inter-terminal seal portion 5 that is susceptible of influences of a temperature rise in the positive 2 and the negative electrode terminal 3 upon a temperature rise in the battery can be prevented from cleaving even when its temperature grows higher than that of any other seal portion.

While it is shown in FIGS. 1A, 1B and 1C and described that the covering film 4 is formed of a film 41 embossed to such a size as to contain the battery element and a flat sheet-form film 42, it is contemplated that the embossed film 41 and flat film 42 may be each a separate covering film, or they may be a continuous covering film.

Referring to one exemplary lithium ion battery, a positive and a negative electrode active substance are coated on an aluminum foil and a copper foil, respectively, while their portions for drawing the positive and negative electrode terminals are partly left uncoated, into a positive and a negative electrode sheet. Then, these electrode sheets are stacked together with a porous separator between them, which separator has a three-layer structure of polypropylene, polyethylene or polypropylene/polyethylene/polypropylene, thereby fabricating a battery element.

In that case, the stacking operation is carried out such that the portions of the foils with no positive and negative electrode active substances coated on them are on the same side. External current-drawing tabs, aluminum for the positive electrode and nickel for the negative electrode, are then drawn out of the stack by ultrasonic welding to make a positive and a negative electrode terminal, respectively. The stack that becomes the battery element with the positive and negative electrode terminals drawn from it is coated at its top surface with a flexible film embossed in conformity with the shape of the stack and at its bottom surface with a flat sheet-form flexible film.

For the covering film, it is preferable to use a laminated film with aluminum laminated on a polyolefin resin film, a polyester film, a nylon film or the like.

The covering film is sealed up by heat fusion of its periphery by frame-like heat fusion means. The sealing operation is carried out such that the fusion width 51 of the inter-terminal seal portion 5 is larger than that of any other seal portion 6.

Then, an electrolysis solution using $LiPF_6$ as a carrier salt and ethylene carbonate (EC):diethyl carbonate (DEC)=30:70 (by volume %) or the like as a solvent is poured in the battery. In this case, the heat fusion is carried out while an electrolysis solution feed pore is left unfused, the electrolysis solution is then pored in the battery through the feed pore, and the electrolysis solution feed pore is finally sealed up.

When two films, an embossed film and a flat sheet-form film, are used, four peripheral sides must be heat fused to seal up them. However, when one single flexible film is used in a folded way, it may be sealed on three peripheral sides.

The safety valve may be located at any desired position other than the inter-terminal seal portion 5; however, it is preferable to locate it on the side opposite to that with the electrode terminals located in it as shown.

The lithium ion battery here should preferably include as the positive electrode active substance a composite lithium manganese oxide such as lithium manganate, and preference is given to one represented by a composition formula $Li_{1+x}Mn_{2-x-y}M_yO_{4-z}$ ($0.03 \leq x \leq 0.16$, $0 \leq y \leq 0.1$, $-0.1 \leq z \leq 0.1$, and M is at least one selected from Mg, Al, Ti, Co and Ni) having a plateau near 4 V with respect to metallic lithium. By use of a composite lithium manganese oxide having such particle shape, particle size distribution, mean particle diameter, specific surface area and true density as to give a positive electrode density of at least 2.8 g/cc in a portion from which a collector metal foil is removed, it is possible to obtain an improved energy density. Of positive electrode blends comprising a positive electrode active substance, a binder, a conductivity additive, etc., it is preferable to use one containing the positive electrode active substance in an amount of at least 80% by weight.

Such a composite lithium manganese oxide as described above may use lithium carbonate, lithium hydroxide, lithium oxide or the like as a lithium source. For a manganese source, use may be made of manganese dioxide, manganese sesquioxide, manganese tritetroxide, basic manganese oxide, manganese carbonate, and manganese nitrate.

Among others, a more preferable lithium source is lithium carbonate and a more preferable manganese source is manganese oxide, manganese sesquioxide, and manganese tritetroxide from the viewpoints of ease of handling and ease with which an active substance having high packing capability is obtained.

For the synthesis of the composite lithium manganese oxide, such lithium and manganese sources as described above are weighed and mixed together at a given composition ratio. It is here preferable that in order to improve the reactivity between the lithium source and the manganese source and get around the residence of foreign phases of manganese sesquioxide, the maximum particle diameter of the lithium source is set at up to 2 μm, and the maximum particle diameter of the manganese source is set at up to 30 μm. The mixing operation may be done, using a ball mill, a V-type mixer, a cutter mixer, a shaker or the like. Further, the obtained power mixture is fired in an atmosphere having a oxygen partial pressure higher than that of air at a temperature range of 600° C. to 950° C.

The positive electrode is fabricated by mixing the composite lithium manganese oxide with a binder and a conductivity additive such as carbon black or acetylene black, and coating the mixture onto a collector metal foil. The binder here may be polyvinylidene fluoride (PVdf), polytetrafluoroethylene (PTFE) or the like, and a preferable collector metal foil is an aluminum foil.

The negative electrode that is graphite or amorphous carbon capable of inserting or deinserting lithium is fabricated by mixing it with a binder species approximately selected depending on important battery characteristics such as rate characteristics, output characteristics, low-temperature discharge characteristics, pulse discharge characteristics, energy density and downsizing. The binder here may be polyvinylidene fluoride (PVdF), polytetrafluoroethylene (PTFE), a rubber binder, etc. as is the case with the positive electrode, and a preferable collector metal foil is a copper foil.

The separator here may be a porous plastic film of polypropylene, polyethylene or a three-structure of polypropylene/polyethylene/polypropylene, and has preferably a thickness of 10 μm to 30 μm with rate characteristics and battery's energy density and mechanical strength in mind.

The solvent for a non-aqueous electrolysis solution may be carbonates, ethers, ketones or the like, and preference is given to a mixture of at least one of ethylene carbonate (EC), propylene carbonate (PC), γ-butyrolactone (GBL) or the like that is a solvent having a high dielectric constant with at least one of diethyl carbonate (DEC), dimethyl carbonate (DMC), ethylmethyl carbonate (EMC) or the like that is a low-viscosity solvent.

Of these, preference is given to the combinations of EC+DEC, EC+EMC, EC+DMC, PC+DEC, PC+EMC, PC+DMC, PC+EC+DEC or the like. When the purity of the solvent is low or the moisture content of the solvent is high, it is better to make the mixing ratio of solvent species such that a potential window grows wide on a high-potential side. Further, the addition of trace additives may be acceptable for the purpose of improving water consumptions, resistance to oxidation, the level of safety, etc.

The carrier salt here may be at least one selected from the group consisting of $LiBF_4$, $LiPF_6$, $LiClO_4$, $LiAsF_6$, $Li(CF_3SO_2)N$ and $Li(C_2F_5SO_2)_2N$, among which a system including $LiPF_6$ is preferred. The concentration of the carrier salt is preferably 0.8 mol/l to 1.5 mol/l, and more preferably 0.9 mol/l to 1.2 mol/l.

FIGS. 2A, 2B and 2C are illustrative of the lithium ion battery according to another embodiment of the present invention. This embodiment is different from the embodiment shown in FIGS. 1A, 1B and 1C in that there is a retaining member 8 located on the outer surface of the inter-terminal seal portion 5.

The retaining member 8, when the battery is incorporated in battery drive equipment or a plurality of batteries are stacked together, is located in such a way as to be flush with the outer surface 9 of the battery. As a consequence, when there is heat generated from the lithium ion battery, it is possible to prevent the covering film between the positive and the negative electrode terminal from swelling or inflating until a pressure release portion 7 is put into operation.

For the retaining member 8, use may made of an insulating material such as ceramics or synthetic resin, or a metal covered with the insulating material. The synthetic resin material here may have heat resistance as much as that of the polypropylene film used as the covering film, and may be configured in a rectangular or circular column form having a height equal to the height of the lithium ion battery minus the thickness of the inter-terminal sealed portion. Preferably, the covering film between the positive and the negative electrode terminal covers at least a half the area that is not heat fused. The retaining member 8 may be bonded to the inter-terminal seal portion by means of a double-sided adhesive tape or the like.

Figure 3A:
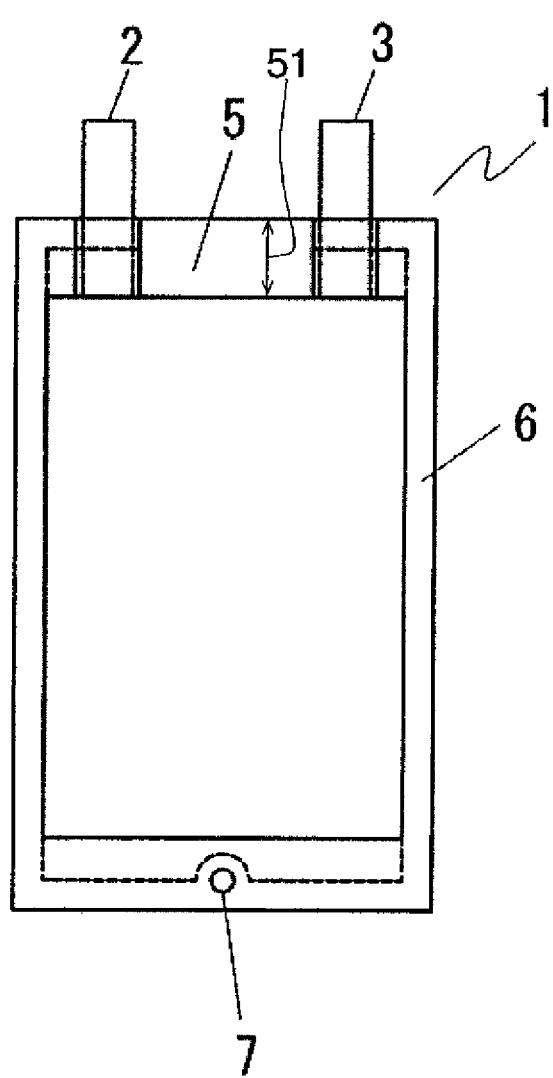
FIG. 3A is a front view illustrative of a closed type battery according to yet another embodiment of the invention.
Figure 3C:
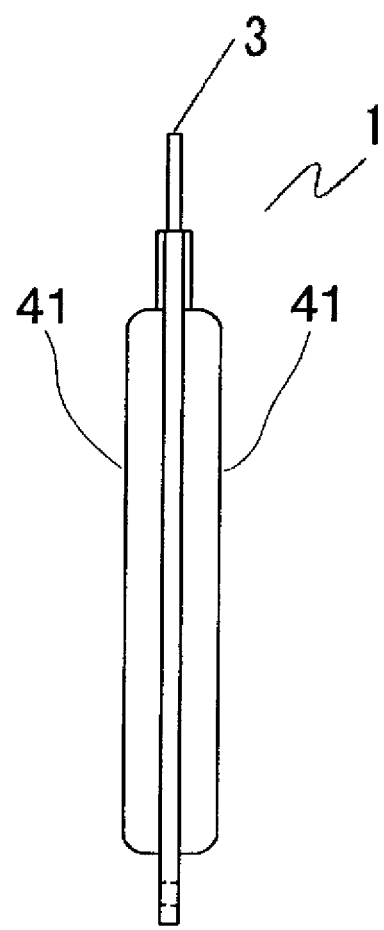
FIG. 3C is a side view of the same.
Figure 3B:
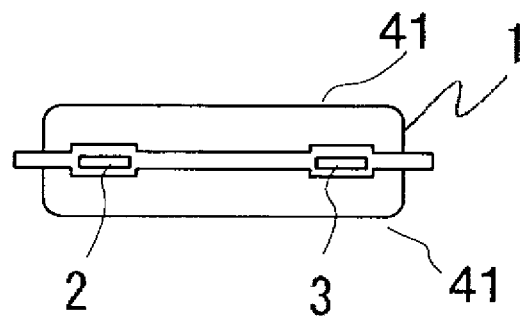
FIG. 3B is a plan view of the same.

FIGS. 3A, 3B and 3C are illustrative of the lithium ion battery according to yet another embodiment of the invention. In the battery according to the embodiment shown in FIGS. 1A, 1B and 1C, one flexible film is provided with an embossed portion adapted to contain the battery element, and another flexible film is provided in a flat sheet form. In the embodiment here, however, both the surfaces of the battery are each formed of an embossed film 41: the battery element is accommodated in the middle of each embossed film 41. And then, the heat fusion seal width 51 of the inter-terminal seal portion 5 is larger than that of any other seal portion, so that there is the internal pressure of the battery increasing, a safety valve 7 is put in operation before the inter-terminal seal portion 5 cleaves, thereby ensuring to release that internal pressure.

The embossed film located on each surface may be an embossed separate film or, alternatively, one single film having two embossed portions may be folded into a covering film.

Figure 4A:
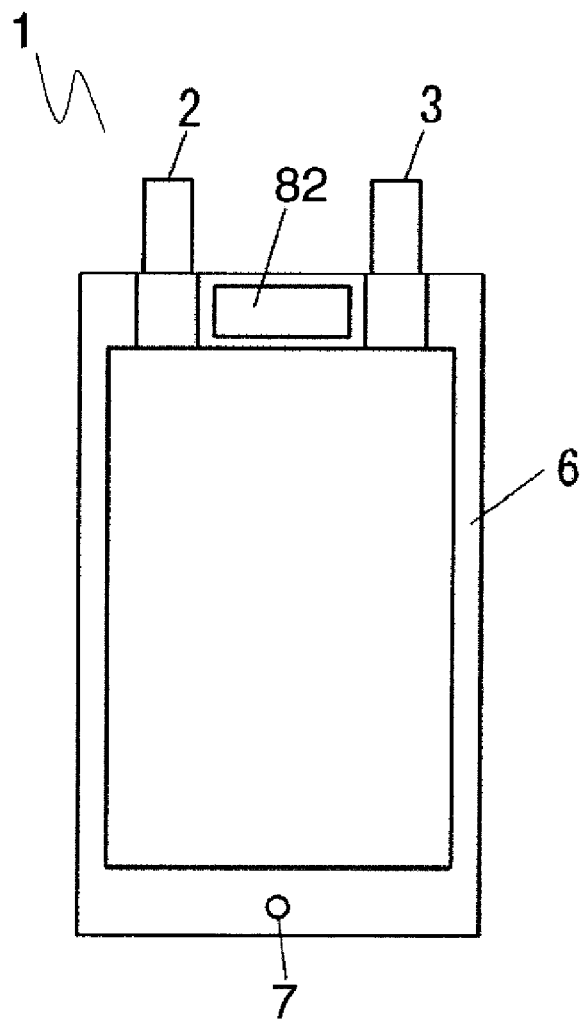
FIG. 4A is a front view illustrative of a closed type battery according to a further embodiment of the invention.
Figure 4C:
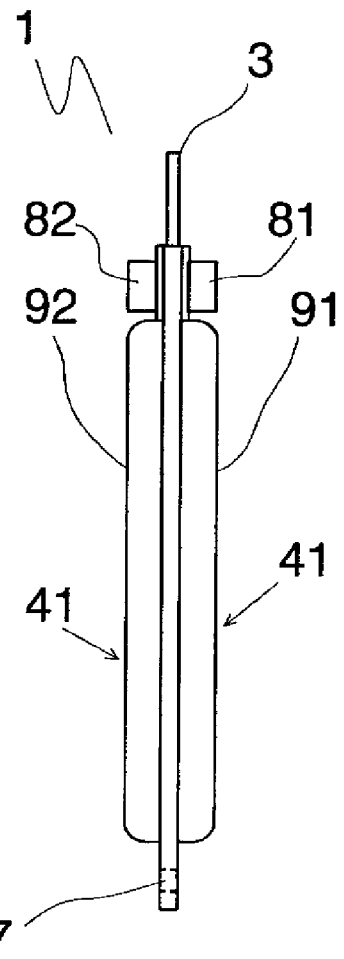
FIG. 4C is a side view of the same.
Figure 4B:
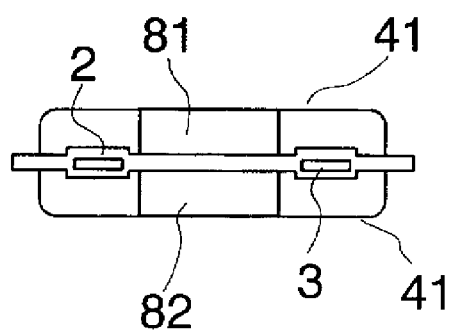
FIG. 4B is a plan view of the same.

FIGS. 4A, 4B and 4C are illustrative of the lithium ion battery according to a further embodiment of the invention. In the battery according to the embodiment shown in FIGS. 2A, 2B and 2C, one flexible film is provided with an embossed portion adapted to contain the battery element, and another flexible film is provided in a flat sheet form. In the embodiment here, however, both the surfaces of the battery are each formed of an embossed film 41: the battery element is accommodated in the middle of each embossed film 41.

And then, the embodiment here is characterized in that retaining members 81 and 82 are located on both the outer surfaces of the inter-terminal seal portion 5. The retaining members 81 and 82 are located in such a way as to be flush with the outer surfaces 91 and 92 of the battery. Consequently, when the battery is incorporated in battery drive equipment or a plurality of batteries are stacked together, the flexible film between the positive and the negative electrode terminal is prevented from swelling or inflating upon an increase in the internal pressure of the battery due to heat generated from the lithium ion battery, so that the internal pressure of the battery is released off by way of the safety valve 7.

Figure 5A:
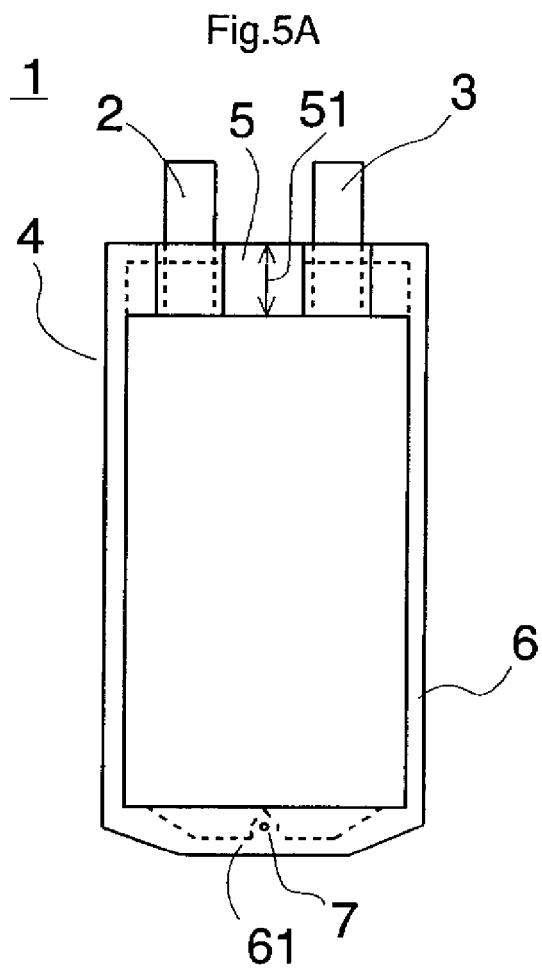
FIG. 5A is a front view illustrative of a closed type battery according to a further embodiment of the invention.
Figure 5B:
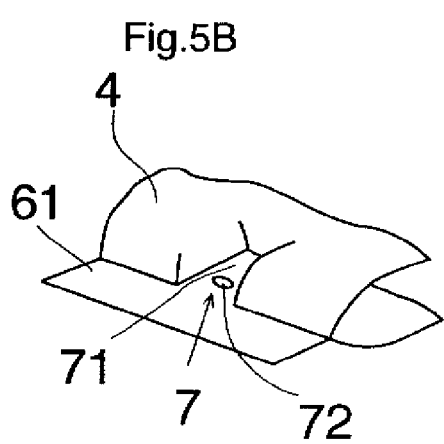
FIG. 5B is illustrative of how a safety valve works.

FIG. 5A is a front view of the closed type battery according to a further embodiment of the invention, and FIG. 5B is illustrative of how a safety valve works. FIGS. 5C, 5D, 5E and 5F are illustrative of that safety valve.

In the closed type battery shown in FIG. 5A, a positive 2 and a negative electrode terminal 3, similar to those shown in FIGS. 1A, 1B and 1C, are coupled to each other, and then sealed around by heat fusion using a flexible film 4 as the covering member.

An inter-terminal seal portion 5 between the positive 2 and the negative electrode terminal 3 is provided with a heat fusion seal portion 51 having a larger width than that of any other seal portion. There is also a safety valve 7 provided on a peninsular heat fusion seal portion extending from a heat fusion seal portion 61 to within the closed type battery 1.

FIG. 5B is illustrative of in what state the safety valve 7 is when there is an increase in the internal pressure. As the internal pressure rises and the covering film 4 swells, stress on the covering film 4 near the peninsular heat fusion seal portion 71 extending from the heat fusion seal portion 61 to within the closed type battery 1 grows larger than that on the heat fusion seal portion 61 below. Consequently, there is a cleavage in the peninsular heat fusion seal portion 71. As that cleavage reaches a through-hole 72, the internal pressure is released from the through-hole 72, so that the closed type battery can be prevented from bursting up.

Figure 5C:
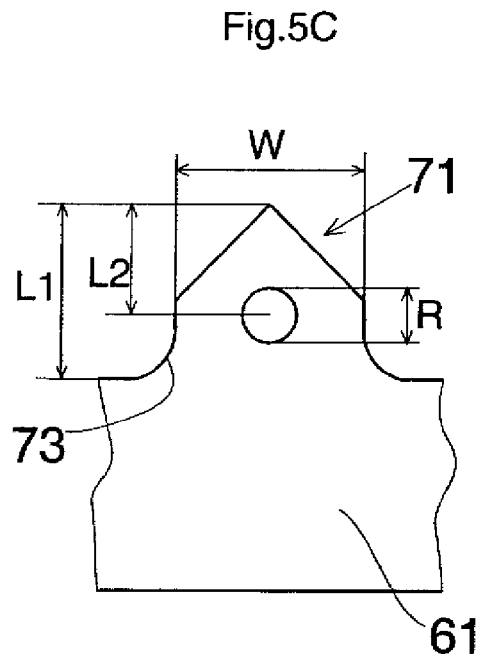
FIGS. 5C-5F are illustrative of the safety valve.

The pressure for putting the safety valve 7 in operation may be adjusted by varying the distance L1 between the end of the peninsular heat fusion seal portion 71 and the heat fusion seal portion 61 below, the distance L2 from the end of the peninsular heat fusion seal portion 71 to the through-hole 72, the diameter R of the through-hole 72 and the width W of the peninsular heat fusion seal portion, as depicted in the enlarged view of FIG. 5C. That pressure may also be properly determined depending on the strength of the covering film used and the strength of the heat fusion seal portion.

If a junction 73 between the peninsular heat fusion seal portion and the heat fusion seal portion 61 below is configured in a curved form, it is then possible to increase the strength of that junction 73.

Figure 5D:
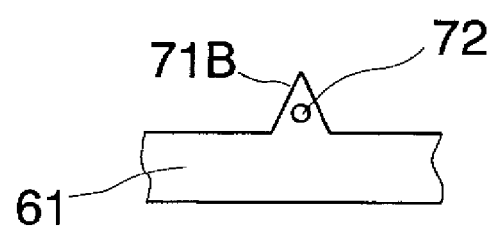
Figure 5E:
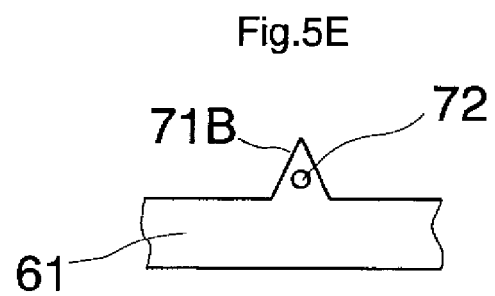
Figure 5F:
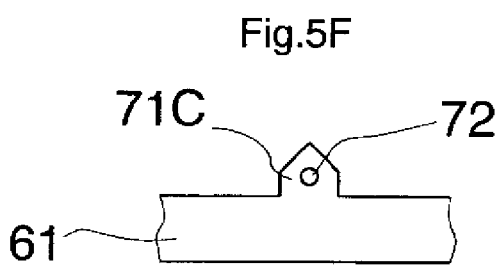

FIGS. 5D, 5E and 5F are illustrative of another example of the peninsular heat fusion seal portion of the safety valve.

The assembled battery according to the invention is now explained. In the assembled battery, a given number of batteries are connected in series or parallel in compliance with currents and voltages demanded for battery drive equipment.

An assembled battery is more affected by heat from nearby batteries than one single battery. However, by using batteries, each having tweaks to an inter-terminal seal portion susceptible of influences of generated heat, the invention can provide an assembled battery having improved characteristics.

FIG. 6A is a view of an assembled battery according to one embodiment of the invention, as viewed from a terminal side. FIG. 6B is a side view of the same. FIG. 6C is illustrative of a unit battery.

In the assembled battery 10 here, a plurality of lithium ion batteries 1 explained with reference to FIGS. 1A, 1B and 1C are stacked one upon another. In each lithium ion battery 1, the fusion width 51 of the inter-terminal seal portion 5 between the positive 2 and the negative electrode terminal 3 is larger than that of the any other seal portion, so that when there is an increase in the internal pressure of the battery, it is kept against any cleavage before the safety valve 7 is put into operation, thereby making sure pressure release operation.

Each safety valve 7 is located at a portion other than the inter-terminal seal portion 5 and in no contact with the covering member of a nearby battery upon stacking, so that when there is an increase in the pressure, the safety valve 7 is put in reliable operation without being disturbed by the nearby battery.

FIG. 7A is a view of an assembled battery according to another embodiment of the invention, as viewed from a terminal side. FIG. 7B is a side view of the same. FIG. 7C is a plan view illustrative of a unit battery.

In the assembled battery 10 here, a plurality of lithium ion batteries 1 described with reference to FIGS. 2A, 2B and 2C are stacked one upon another. The retaining member 8 located at the inter-terminal seal portion 5 of each unit battery 1 comes into contact with the flat sheet-form film 42 of the adjoining unit battery 1, so that it is pressed by the two unit batteries. Consequently, the inter-terminal seal portion 5 is prevented from any cleavage before the actuation of the safety valve 7, even when there is an increase in the internal pressure of the battery, thereby making sure the operation of the safety valve 7.

FIG. 8A is a view of an assembled battery according to yet another embodiment of the invention, as viewed from a terminal side. FIG. 8B is a side view of the same, and FIG. 8C is illustrative of a unit battery.

In the assembled battery 10 here, a plurality of lithium ion batteries 1 explained with reference to FIGS. 4A, 4B and 4C are stacked one upon another. The lithium ion battery 1 is provided at the inter-terminal seal portion 5 with retaining members 81 and 82, the surfaces of which are set in such a way as to be flush with the outer surfaces 91 and 92 of the battery formed by an embossed film 41. As a result, at the time of stacking of the batteries, the inter-terminal seal portion 5 is pressed by the retaining members 81 and 82, so that even when there is an increase in the internal pressure of the battery, it is possible to prevent the inter-terminal seal portion 5 from any cleavage before the pressure release portion 7 is put in operation.

Figure 9:
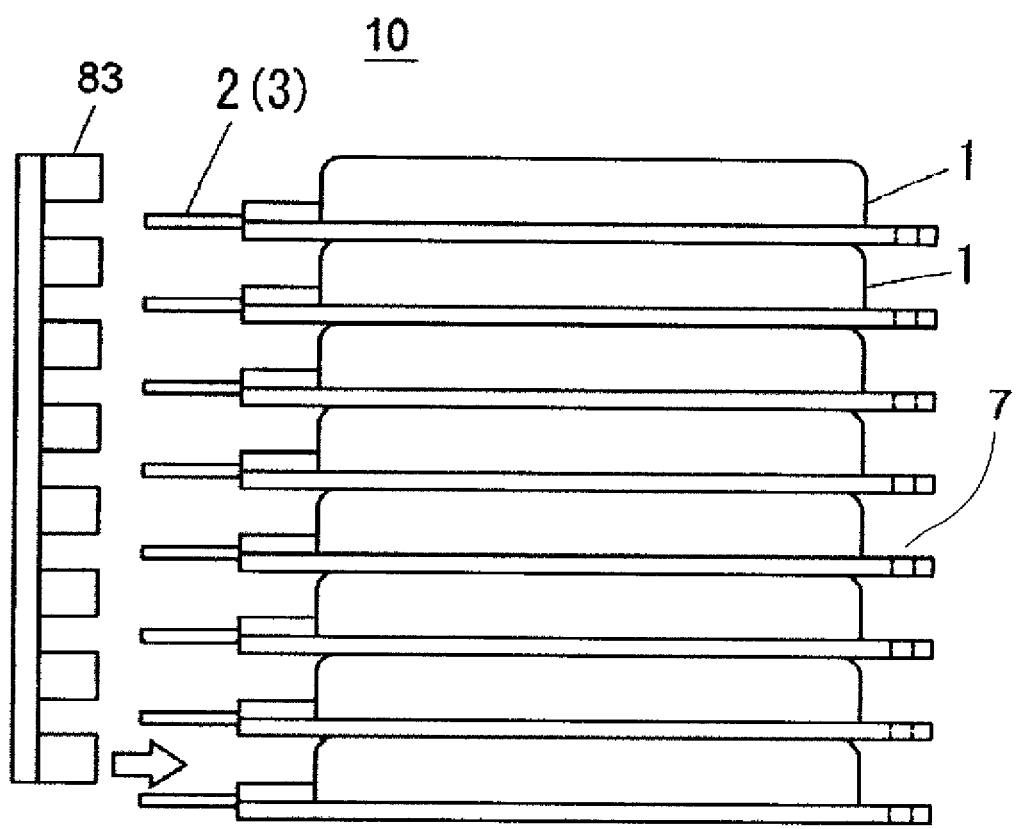
FIG. 9 is a side view illustrative of an assembled battery according to one embodiment of the invention.

FIG. 9 is a side view illustrative of an assembled battery according to a further embodiment of the invention.

In the assembled battery 10 here, a plurality of lithium ion batteries 1 explained with reference to FIGS. 2A, 2B and 2C are stacked one upon another. In the embodiment here, the retaining member 8 located at the inter-terminal seal portion of each unit lithium ion battery is made up of an integral type retaining member 83. After a given number of lithium ion batteries are stacked together, the integral type retaining member 83 is inserted between the inter-terminal seal portions from the terminal side to press the inter-terminal seal portions: this assembled battery has similar actions as is the case with an assembled battery with a retaining member mounted to it in advance.

Figure 10A:
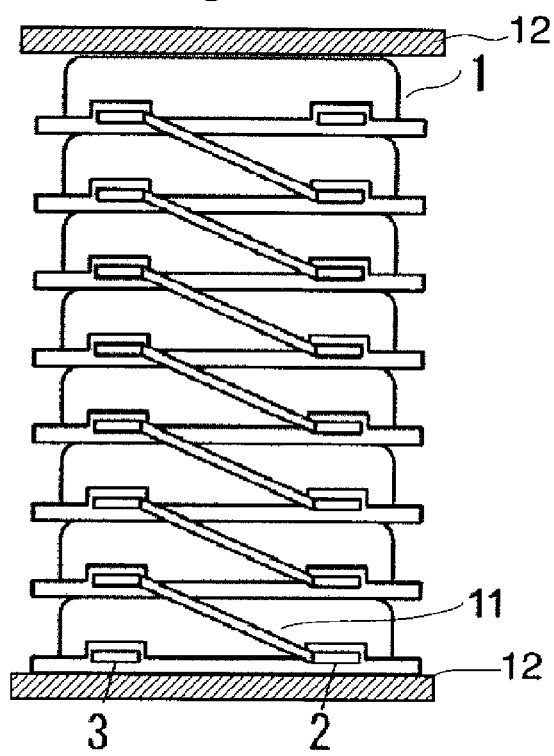
FIG. 10A is a view illustrative of an assembled battery comprising unit batteries connected together according to one embodiment of the invention, as viewed from a terminal side.
Figure 10B:
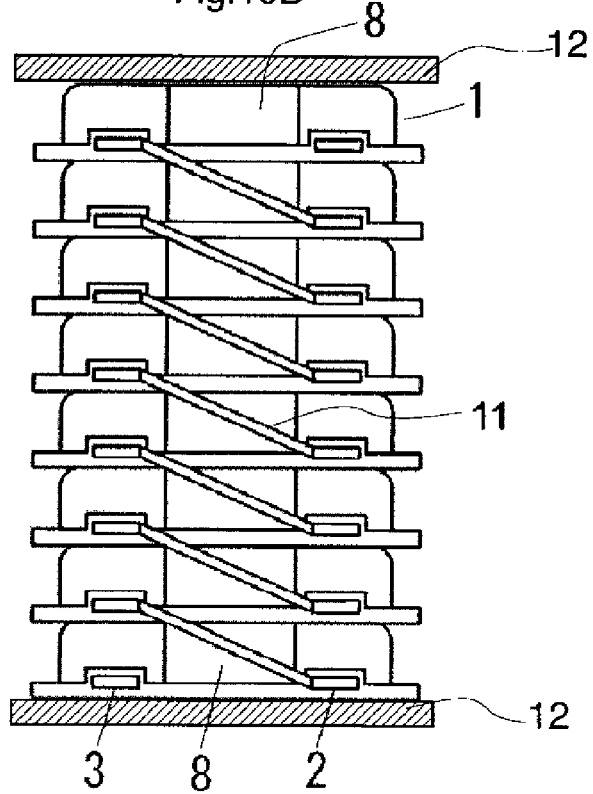
FIG. 10B is a view illustrative of an assembled battery comprising unit batteries connected together according to another embodiment of the invention, as viewed from a terminal side.

FIGS. 10A and 10B are illustrative of what state the unit batteries of the assembled battery of the invention are mutually connected in.

In the assembled battery 10 here, the lithium ion batteries explained with reference to FIGS. 1A, 1B and 1C are stacked one upon another. A positive and a negative electrode terminal are connected together by a conductive member 11 comprising nickel, a clad member having a nickel-copper-nickel structure or the like in such a way as to be connected in series. Then, the stack is sandwiched between end plates 12 provided on both its ends at a constant width into the assembled battery 10. Each end plate is preferably formed of a metal plate having improved heat radiation, for instance, an aluminum plate.

FIG. 10B is illustrative of an assembled battery 10 wherein the lithium ion batteries described with reference to FIGS. 2A, 2B and 2C are stacked one upon another with the retaining member 8 mounted in place. Otherwise, this assembled battery is similar in construction to that of FIG. 10A.

The present invention is now explained with reference to some examples.

EXAMPLE 1

Preparation of the Lithium Ion Battery

Lithium manganate as the positive electrode active substance and carbon black as the conductive additive were mixed together at a mixing rate of lithium manganate: carbon black:polyvinylidene fluoride=90:6:4 by mass, and the mixture was dispersed in N-methyl-2-pyrrolidone (NMP) into a slurry. The obtained slurry was coated onto a 20-μm thick aluminum foil, after which NMP was evaporated off to obtain a positive electrode sheet.

The positive electrode sheet was punched out into an active substance-coated portion of 55 mm in width and 100 mm in height and a portion of 10 mm in width and 15 mm in height with no active substance coated on it, which was used for drawing currents.

Graphite as the negative electrode active substance was dispersed in N-methyl-2-pyrrolidone (NMP) at a rate of graphite:polyvinylidene fluoride=90:10 by mass into a slurry. The obtained slurry was coated onto a 15-μm thick copper foil, after which NMP was evaporated off to obtain a negative electrode sheet. The negative electrode sheet was punched out into an active substance-coated portion of 59 mm in width and 104 mm in height and a portion of 10 mm in width and 15 mm in height with no active substance coated on it, which was used for drawing currents.

Nine such positive electrode sheets and 10 such negative electrode sheets were stacked one upon another with a 25-μm thick separator of a polypropylene/polyethylene/polypropylene structure between adjacent sheets in such a way that the current drawing portions of the positive and negative electrode sheets lied in the same direction, after which positive electrode terminals comprising aluminum were joined to the current-drawing portions of the positive electrode sheets by means of ultrasonic welding. Negative electrode terminals comprising nickel were then joined to the current-drawing portions of the negative electrode sheets by means of ultrasonic welding to prepare an electrode element.

Two covering films, each comprising a laminate of 30 μm-thick nylon/50-μm thick aluminum/50-μm thick polypropylene, were provided, one in a form embossed in such a way as to contain the battery electrode and another in a flat sheet form. With the polypropylene layer positioned inside, heat fusion was carried out while leaving an electrolysis solution feed port on a side at right angles with the side from which the positive and negative electrode terminals were drawn.

In this heat fusion operation, the heat fusion width between the positive and the negative electrode terminal, i.e., the portion indicated by 51 in FIG. 1, was set to 10 mm, and that of any other heat fusion was set to 5 mm. On the side opposite to the side from which the positive and negative electrode terminals were drawn, there was a heat fusion portion formed, which extended from the surrounding heat fusion portions to 5 mm inside the battery at a width of 5 mm, with an isosceles triangular end of 4 mm in height. A through-hole of 1.5 mm in diameter was formed at a 4 mm distance from the vertex of the isosceles triangle to the periphery in the vertical direction to form a safety valve.

An electrolysis solution with 1 mol/l $LiPF_6$ as the carrier salt and ethylene carbonate (EC):diethyl carbonate (DEC)= 30:70 by volume as the solvent was poured in the stack through the feed port by means of vacuum impregnation, and the electrolysis solution feed port was then sealed up to obtain a lithium ion battery.

The obtained lithium ion battery was charged to 4.2 V at 0.3 C by constant current charging, and then by constant voltage charging until the total charging time reached 10 hours, after which the battery was discharged down to 3.0 V on a 0.2 C constant current.

Preparation of the Assembled Battery

Eight such lithium ion batteries prepared as mentioned above were stacked one upon another as shown in FIG. 9A, and connected in series by means of a conductive material comprising nickel clad around copper, and aluminum plates of 2 mm in thickness were attached to the top and bottom of the stack, and the top and bottom aluminum plates were fixed by means of bolts and nuts.

Overcharge Testing

The assembled battery fabricated as mentioned above was charged on a 1 C constant charge current at an ambient temperature of 25° C. for 3 hours. With a 72 V voltage initially applied on the assembled battery, the safety valves of all the unit batteries constituting the assembled battery were actuated to release pressures from inside: there was no cleavage in other heat fusion portions.

EXAMPLE 2

Example 1 was repeated to fabricate a unit battery with the exception that the heat fusion width of the inter-terminal seal portion was set to 5 mm as in other peripheral seal portions, and a polycarbonate retaining member of 20 mm in length, 10 mm in width and 3 mm in thickness was joined to an inter-terminal press portion. An assembled battery was fabricated as in Example 1, and overcharge testing was carried out as in Example 1. The safety valves of all the unit batteries constituting the assembled batter were actuated to release pressures from inside: there was no cleavage in other heat fusion portions.

EXAMPLE 3

As in Example 1, an assembled battery is fabricated with the exception that for the positive electrode active substance, lithium manganate and lithium nickelate having a composition formula $LiNi_{0.8}Co_{0.20}O_2$ were mixed together at 8:2 by weight, and overcharge testing was performed as in Example 1.

The safety valves of all the unit batteries constituting the assembled batter were actuated to release pressures from inside: there was no cleavage in other heat fusion portions.

COMPARATIVE EXAMPLE 1

Example 1 was repeated to fabricate a unit battery with the exception that the heat fusion width of the inter-terminal seal portion was set to 5 mm as in other peripheral seal portions, and the unit batteries were stacked one upon another into an assembled battery that was in turn subjected to overcharge testing as in Example 1.

Out of 8 unit batteries constituting the assembled battery, the safety valves of six were actuated to release pressures from inside, but there was a cleavage in the heat fusion portions of two.

What is claimed is:

1. An assembled battery, comprising
a plurality of unit batteries connected in series or parallel and stacked one upon another, wherein each of the unit batteries comprises a battery element and a covering film wherein the covering film covers the battery element and is sealed by heat fusion on a periphery of the covering film,
an inter-terminal seal portion is formed between a positive electrode terminal and a negative electrode terminal, said inter-terminal seal portion is larger than that of any other seal portion;
wherein the positive electrode terminal and the negative electrode terminal are located on the same side;
a safety valve is located at a portion other than the inter-terminal seal portion and is not in contact with the surface of the covering film of an adjoining unit battery;
wherein an internal pressure of said inter-terminal seal portion is released by the safety valve;
wherein each of the unit batteries have a heat-resistant retaining member, said heat resistant retaining member is located on the outer surface of the inter-terminal seal portion and adapted to be in contact with the cover film of the adjoining unit battery, and the heat-resistant retaining member is a rectangular or circular column shape having a height equal to the height of the unit battery minus the thickness of the inter-terminal sealed portion.

2. The assembled battery according to claim 1, wherein a heat fusion seal portion extending from an outer periphery of the battery around said inter-terminal seal portion to within the battery is wider than that positioned at any other seal portion.

3. The assembled battery according to claim 1, wherein the assembled battery comprises a lithium ion battery wherein a composite lithium manganese oxide having a composition formula $Li_{1+x}Mn_{2-x-y}M_yO_{4-z}$ where $0.03 \leq x \leq 0.16$, $0 \leq y \leq 0.1$, $-0.1 \leq z \leq 0.1$, and M is at least one selected from Mg, Al, Ti, Co and Ni is used for a positive electrode active substance.

4. The assembled battery according to claim 1, wherein a retaining member is flush with an outer surface of the inter-terminal seal portion.

5. The assembled battery according to claim 1, wherein the heat-resistant retaining member is flush with the outer surface of the inter-terminal seal portion.

6. The assembled battery according to claim 1, wherein an integral type retaining member made up by retaining member located at an internal terminal portion of each unit lithium ion battery is integrally positioned in between the inter-terminal seal portion of each unit battery at a terminal end of the unit batteries.

7. The assembled battery according to claim 1, wherein a heat-resistant retaining member is flush with the outer surface of the inter-terminal seal portion.

* * * * *